Patented Dec. 30, 1941

2,267,749

UNITED STATES PATENT OFFICE 2,267,749

PROCESS OF CONVERTING DIHYDROXY COMPOUNDS OF THE ACETYLENE SERIES INTO DIHYDROXY COMPOUNDS OF THE ETHYLENE SERIES

Walter Reppe and Richard Schnabel, Lugwigs-hafen-on-the-Rhine, Germany, assignors, by mesne assignments, to General Aniline & Film Corporation, New York, N. Y., a corporation of Delaware No Drawing. Application October 14, 1938, Serial No. 234,902. In Germany October 30, 1937

5 Claims. (Cl. 260—635)

The present invention relates to a process of converting dihydroxy compounds of the acetylene series into dihydroxy compounds of the ethylene series.

We have found that dihydroxy compounds of the acetylene series, especially compounds corresponding to the general formula

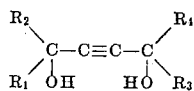

in which $R_1$, $R_2$, $R_3$ and $R_4$ are hydrogen or identical or different radicles of aliphatic, cycloaliphatic or aromatic hydrocarbons, can be converted into dihydroxy compounds of the ethylene series in a very simple and advantageous manner by treating them in aqueous alkaline solution or suspension with metallic zinc, preferably in fine dispersion, as it is obtained for example in the electrolytic production of zinc. There may also be added as activators metals capable of forming galvanic elements with zinc.

Contrary to expectation, only relatively small amounts of free hydrogen are formed in the hydrogenation by the present process, so that the utilization of the zinc is very favorable. Moreover, the hydrogenation of the acetylene linkage proceeds only to the formation of the ethylene linkage without any appreciable formation of the corresponding saturated compounds.

Suitable starting materials of the above general formula may be obtained according to the process of the application for Letters Patent Ser. No. 223,855, filed September 8, 1938, which matured into Patent No. 2,232,867 on February 25, 1941, in the name of Walter Reppe and Ernest Keyssner by the condensation of aldehydes or ketones with acetylene-hydrocarbons containing at least one free hydrogen atom attached to the acetylene carbon atoms, in the presence of acetylene compounds of heavy metals of the first and second group of the periodic system.

For the preparation of the aqueous alkaline solution there may be used metal oxides and hydroxides which dissolve in water with alkaline reaction or aqueous solutions of ammonia or derivatives of ammonia, such as hydroxyl amines and hydrazines and organic amines, especially those, soluble or easily dispersible in water, such as primary, secondary or tertiary low molecular aliphatic mono-amines and polyamines, aralkyl amines such as benzyl amine, cycloaliphatic amines, aromatic amines, heterocyclic nitrogen compounds, such as pyridine or piperidine, and quaternary ammonium hydroxides, derived from these compounds. These alkaline substances may be used in various concentrations, for example in 20 per cent solutions or preferably in 4 to 6 per cent solutions. If desired, organic solvents which are not attacked under the reaction conditions may be added to the aqueous solutions, as for example aliphatic alcohols.

It is often advantageous to work in the presence of a dispersing or wetting substance, such as alkyl naphthalene-sulfonic alkali salts or the addition products of 20 molecular proportions of ethylene oxide to fatty alcohols of high molecular weight, in order to produce the most intimate possible contact between all the reactants.

Generally speaking, it is sufficient to work at atmospheric pressure and at ordinary or slightly elevated temperature, but any other pressure may be used within a wide range of temperatures.

Among suitable activating metals which are capable of forming galvanic elements with zinc there may be mentioned for example copper, manganese, iron, cobalt and nickel. The amount necessary for the activation is usually very small. It can be established without trouble by a simple preliminary experiment which combination is most suitable for the hydrogenation to be carried out. In most cases, the addition of an activating metal can entirely be dispensed with.

When carrying out the hydrogenation in the presence of alkali metal hydroxides, the hydrogenation may be so conducted that zinc passes completely into solution as zincate during the course of the process, by using the alkali metal hydroxide in such an amount that the zinc hydroxide formed can be dissolved to form zincate. It is possible to effect the regeneration of the zinc by electrolysis of the zincate solutions, because in this way the zinc is obtained in so finely divided a form, that it is suitable for direct reuse without further treatment. In some cases, it is preferable to employ smaller amounts of the alkali metal hydroxide than are theoretically necessary for the formation of zincate. At the end of the hydrogenation, the zinc employed is mainly obtained in the form of a zinc oxide suspension.

The process may be carried out continuously or discontinuously. After separating the zinc oxide or the zincate formed, the alcohols of the ethylene series may be recovered in pure form in a simple manner, as for example, after distilling off the solvent. They are in part hitherto difficultly accessible or inaccessible compounds which are valuable industrially by reason of the many purposes for which they may be used.

The following example will further illustrate how the said invention may be carried out in practice but the invention is not restricted to this example.

Example 304 grams of 35 per cent caustic soda solution are allowed to drop in the course of 2 hours while stirring at 20° C. into a mixture of 344 grams of butine-diol-1.4, 180 grams of water and 352 grams of 78 per cent electrolytic zinc dust, care being taken by cooling with ice-water that the temperature does not rise appreciably above 20° C. After the mixture has been stirred for 20 hours at 20° C., the zinc oxide formed is filtered off and the filter residue washed with water to a weakly alkaline reaction. The filtrates are combined and hydrochloric acid added thereto until acid to litmus. The water is then evaporated therefrom under reduced pressure and the oily residue thus obtained is filtered by suction from the salts precipitated by the evaporation of the water. The filter residue is washed several times with alcohol, the alcoholic filtrates combined with the said oily fraction and the alcohol expelled by distillation under reduced pressure. The residue is purified by vacuum distillation whereby 316.5 grams (90 per cent yield) of cis-butene-diol-1.4 are obtained which boils between 91° and 100° C. at a pressure of from 0.3 to 0.4 millimeter (mercury gauge). By repeated distillation there is obtained a pure butene-diol having a boiling point of from 104° to 107° C. at a pressure of 0.7 to 0.8 millimeter (mercury gauge). The compound cannot be solidified by cooling with a mixture of ice and common salt.

What we claim is:

1. A process for the conversion of dihydroxy compounds of the acetylene series into dihydroxy compounds of the ethylene series which consists in treating dihydroxy compounds of the acetylene series in aqueous alkaline solution with metallic zinc.

2. A process for the conversion of dihydroxy compounds of the acetylene series into dihydroxy compounds of the ethylene series which consists in treating butine-diols-1,4 in aqueous alkaline solution with zinc dust.

3. A process for the conversion of dihydroxy compounds of the acetylene series into dihydroxy compounds of the ethylene series which consists in treating butine-diols-1,4 in aqueous alkaline solution with zinc dust in the presence of a dispersing agent.

4. A process for the conversion of dihydroxy compounds of the acetylene series into dihydroxy compounds of the ethylene series which consists in treating butine-diols-1,4 in aqueous alkaline solution with zinc dust in the presence of a metal capable of forming a galvanic element with zinc.

5. A process for the conversion of butine-diol-1,4 into butene-diol-1,4 which consists in treating butine-diol-1,4 in an equeous solution of an alkali metal hydroxide with zinc dust.

WALTER REPPE.
RICHARD SCHNABEL.